United States Patent Office 3,381,019
Patented Apr. 30, 1968

3,381,019
SILOXANE-ALCOHOL ETHERS
Edward L. Morehouse, Snyder, N.Y., assignor to Union Carbide Corporation, a corporation of New York
No Drawing. Filed Aug. 27, 1963, Ser. No. 304,988
18 Claims. (Cl. 260—340.9)

This invention relates to organosilicon compounds and particularly to siloxanes containing alcohol and ether groups as well as other possible functional groups.

The compounds of this invention are siloxanes containing at least one hydroxyhydrocarbyloxyalkyl group bonded to silicon. The hydroxyhydrocarbyloxy groups in these novel siloxanes in turn contain a second hydoxy substituent group or an alkenyloxy substituent group. The alkyl group linking the hydroxyhydrocarbyloxy group to silicon in these siloxanes contains at least two successive carbon atoms, one of which is directly bonded to silicon. Those valences of the silicon atoms in the siloxanes which do not bond the silicon atoms to hydroxyhydrocarbyloxyalkyl groups or to other silicon atoms through oxygen atoms link the silicon atoms to hydrogen atoms or monovalent hydrocarbon groups free of aliphatic unsaturation.

One class of the siloxanes of this invention contain the group represented by the formula:

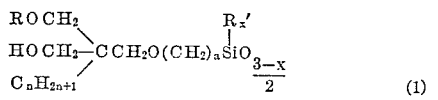   (1)

wherein R is a hydrogen atom or an alkenyl group, $n$ has a value from 1 to 10 inclusive, $a$ has a value of at least 2 (and preferably has a value from 2 to 3 inclusive), R' is a monovalent hydrocarbon group free of aliphatic unsaturation and $x$ has a value from 0 to 2 inclusive.

Another class of siloxanes of this invention containing a group represented by the formula:

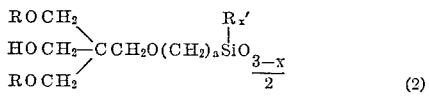   (2)

wherein R, $a$, R', $x$ have the above-defined meanings.

A third class of the siloxanes of this invention contain a group represented by the formula:

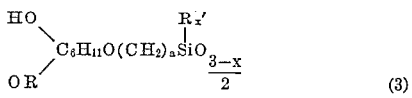   (3)

wherein R, $a$, R', $x$ have the above-defined meanings.

Typical of the alkenyl groups represented by R in Formulae 1, 2 and 3 are the vinyl, allyl, butenyl, pentenyl, hexenyl groups. Typical of the groups represented by R' in Formulae 1, 2 and 3 are the linear alkyl groups (e.g. methyl, ethyl, propyl and butyl groups), cyclic alkyl groups (e.g. cyclopentyl and cyclohexyl groups), the aryl groups (e.g. phenyl and naphthyl groups), the alkaryl groups (e.g. tolyl groups), and the aralkyl groups (e.g. the beta-phenylethyl group). Typical of the groups representing $(CH_2)_a$ in Formulae 1, 2 and 3 are the 1,2-ethylene, 1,3-propylene, 1,4-butylene, and 1,5-pentylene groups.

In addition to hydroxyhydrocarbyloxyalkylsiloxy groups, such as those represented by Formulae 1, 2 and 3, the siloxanes of this invention can also contain siloxy groups represented by the formula:

   (4)

wherein Z represents a hydrogen atom or a monovalent hydrocarbon group free of aliphatic unsaturation such as defined for R' above and $z$ has a value from 0 to 3 inclusive. Typical of the groups represented by Formula 4 are the $SiO_2$, monomethylsiloxy, dimethylsiloxy, trimethylsiloxy, monophenylsiloxy, diphenylsiloxy, triphenylsiloxy, beta-phenylethylsiloxy, methyl(hydrogen)siloxy and methyl(ethyl)siloxy groups. When present in the siloxanes of this invention, groups represented by Formula 4 are present in an amount from 1 to 99 mole percent or preferably from 10 to 90 mole percent with the balance of the groups in the siloxane being hydroxyhydrocarbyloxyalkylsiloxy groups as defined above.

The siloxanes of this invention can be produced by a platinum-catalyzed addition reaction between a suitable alkenyl ether and a siloxane containing silanic hydrogen. Illustrative of the production of a siloxane of this invention by this process is the reaction of a methylhydrosiloxane with trimethylolpropane monoallyl ether (2-ethyl, 2-allyloxymethyl propanediol-1,3), which proceeds according to the equation:

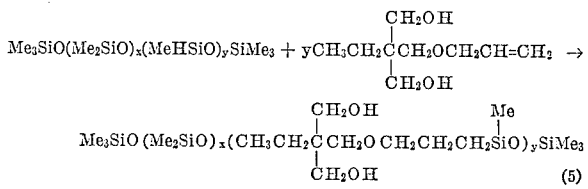   (5)

wherein $x$ and $y$ are integers.

In general the reaction illustrated by Equation 5 can be conducted employing, preferably, from 10 to 20 parts (per million parts by weight of the reactants) of platinum (e.g. in the form of chloroplatinic acid [dissolved, if desired, in a solvent such as tetrahydrofuran, ethanol, butanol or a mixture of ethanol and ethylene glycol dimethyl ether] or in the fom of finely divided elemental platinum supported on a material such as gamma alumina or charcoal). The reaction is conducted at a temperature from 80° C. to 200° C. or preferably at a temperature from 80° C. to 130° C. It is preferred to conduit the reaction in the presence of a liquid organic compound or solvent in which the reactants are mutually soluble. Suitable solvents include alcohols (e.g. ethanol and isopropanol) and aromatic hydrocarbons (e.g. toluene and xylene) and ethers (e.g. diethyl ether and dipropyl ether). Such solvents are employed in an amount from 10 parts to 1000 parts by weight per 100 parts by weight of the reactants.

The relative amount of the alkenyl ether and the siloxane containing silanic hydrogen employed in producing the siloxanes of this invention is not narrowly critical. In those cases where it is desired to preserve some of the alkenyl groups in the alkenyl ether (e.g. where it is desired to produce a siloxane containing the group represented by Formula 1 where R is an alkenyl group), it is desirable to employ amounts of the alkenyl ether that provide a stoichiometric excess of alkenyl groups. Similarly in those cases where an alkenyl ether containing more than one alkenyl group is employed and it is desired to minimize cross-linking, a large excess of the alkenyl ether can be employed.

The order in which the alkenyl ether, the siloxane containing silanic hydrogen and the platinum catalyst are mixed in forming a reaction mixture for use in producing the siloxanes of this invention is not critical. The catalyst can be added separately to the alkenyl ether or to the siloxane or can be added to a mixture of these materials. It is preferable to add the siloxane to the alkenyl ether in increments since this technique minimizes any side reactions (e.g. reaction between the silanic hydrogen and the COH groups of alkenyl ether) which may occur to some extent. This method of the addition also aids in controlling the reaction which is often exothermic. Additional catalyst can be added during the course of the reaction in the event the rate of the reaction decreases (e.g. due to catalyst positioning).

The particular alkenyl ether employed in producing a siloxane of this invention will, of course, depend upon the desired structure of the siloxane to be produced. By way of illustration, when it is desired to produce a siloxane containing the group represented by Formula 1, suitable alkenyl ether starting materials are trimethylolethane monoallyl ether; trimethylolpropane monoallyl ether; trimethylolbutane monoallyl ether; and other monoallyl ethers of other trimethylolalkanes as well as the analogous diallyl ethers such as trimethylol propane diallyl ether. As a further illustration, when it is desired to produce a siloxane containing the group represented by Formula 2, suitable alkenyl ethers starting materials are the mono-, di-, and triallyl ether of pentaerythritol. As a still further illustration, when it is desired to produce siloxanes containing the group represented by Formula 3, suitable alkenyl ether starting materials include the mono- and di-allyl ethers of hexanetriol. Similarly when it is desired to produce a hydroxyhydrocarbyloxyalkyl siloxane of this invention wherein the hydroxyhydrocarbyloxy group contains a substituent phenyl group, suitable alkenyl ether starting materials include 2-phenyl, 2-allyloxymethyl propanediol-1,3 and 2-phenyl, 2-hydroxymethyl 1,3-di-allyloxypropane. When it is desired to produce a hydroxyhydrocarbyloxy aryl siloxane of this invention wherein the hydroxyhydrocarbyloxy groups contains a cycloalkyl substituent, suitable alkenyl ether starting materials include 2-cyclohexyl, 2-allyloxymethyl propanediol-1,3 and 2-cyclohexyl, 2-hydroxymethyl 1,3-diallyloxypropanediol. The formulae of typical alkenyl ethers suitable for use in producing the siloxanes of this invention are as follows:

| Formula | Name |
| --- | --- |
| CH₃CH₂C(CH₂OH)₂CH₂OCH₂CH=CH₂ | Trimethylolpropane monoallyl ether. |
| CH₃CH₂C(CH₂OCH₂CH=CH₂)₂CH₂OH | Trimethylolpropane di-allyl ether. |
| C(CH₂OH)₃CH₂OCH₂CH=CH₂ | Pentaerythritol monoallyl ether. |
| C(CH₂OCH₂CH=CH₂)₂(CH₂OH)₂ | Pentaerythritol diallyl ether. |
| C(CH₂OCH₂CH=CH₂)₃CH₂OH | Pentaerythritol triallyl ether. |
| (CH₃)₂C(CH₂OH)CH₂OCH₂CH=CH₂ | Dimethylolpropane monoallyl ether (2,2-dimethyl-1,3-propanediol monoallyl ether). |
| C₆H₅C(CH₂OH)₂CH₂OCH₂CH=CH₂ | Trimethylolmethylbenzene monoallyl ether (2-phenyl-2-allyloxymethyl propanediol-1,3). |
| C₆H₅C(CH₂OCH₂CH=CH₂)₂CH₂OH | Trimethylolmethylbenzene diallyl ether (2-phenyl, 2-hydroxy methyl 1,3-propanediol diallyl ether). |

Other alkenyl ethers suitable for use in producing the siloxanes of this invention are the following:
2-phenyl, 2-allyloxymethyl propanol;
2-methyl, 2-allyloxymethyl propanol;
α,α-dimethylolethylbenzene monoallyl ether (2-phenyl, 2-methyl, 1,3-propanediol monoallyl ether);

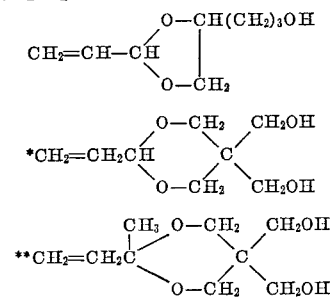

*Produced by reacting acrolein and pentaerythritol.
**Produced by reacting methacrolein and pentaerythritol.

alkenyl ethers of:

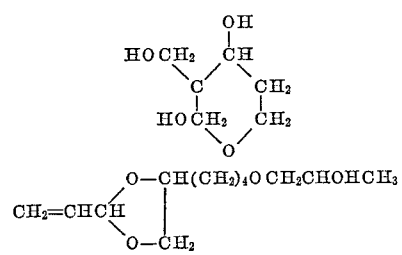

or alkenyl ethers of:

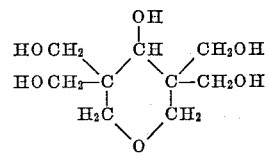

The alkenyl ethers employed in producing the siloxanes of this invention are readily prepared by conventional methods. By way of illustration the allyl ethers of the trimethylolpropane can be prepared by first reacting one mole of butyraldehyde with three moles of formaldehyde to produce trimethylolpropane. The trimethylolpropane is then converted to the corresponding alkoxide by reaction with sodium hydroxide and the alkoxide can be reacted with allyl chloride to produce an allyl ether of trimethylol propane.

The siloxane containing silanic hydrogen employed in producing the siloxanes of this invention contain the group represented by the formula:

  (6)

wherein R' and $x$ have the above-defined meanings. Such starting siloxanes can also contain groups represented by Formula 4.

At the conclusion of the reaction illustrated by Equation 5, the siloxane of this invention produced as a product that can be isolated from the reaction mixture by conventional means. When chloroplatinic acid is used as a catalyst, acidic compounds are formed which are preferably neutralized with a basic compound (e.g. sodium bicarbonate, before isolating the siloxane). Suitable means for isolating the siloxane include sparging the reaction mixture by passing an inert gas (e.g. nitrogen) through the reaction mixture which is maintained at an elevated temperature (e.g. a temperature up to 170° C.) to volatilize any unreacted volatile starting materials. The insoluble catalyst and any insoluble by-product can be conveniently removed by filtration. Fractional distillation can be employed where the siloxane is relatively volatile. In those cases where the siloxane or the siloxane-solvent solution is immiscible with the reactants, separation can be achieved by decantation or use of a separatory funnel.

The above-described addition reaction producing the siloxanes of this invention is remarkably efficient, particularly when allyl ether starting materials are employed, as compared to seemingly analogous reactions involving allyl alcohol. Specifically, when allyl alcohol is reacted with a siloxane containing silanic hydrogen, the reaction of the COH group of the alcohol with silanic hydrogen occurs to a significant extent and may even be the predominant reaction. On the other hand, when alkenyl ethers, particularly allyl ethers, are employed as described above in producing the siloxanes of this invention, little if any reaction between the COH groups in the alkenyl ether and the silanic hydrogen occurs. Moreover, the reaction of such allyl ethers with siloxanes containing silanic hydrogen to produce siloxanes of this invention is extremely rapid as compared to the sluggish reactions of this type heretofore known.

The siloxanes of this invention are particularly useful as stabilizers for urethane foams, especially for rigid urethane foams. Foams so stabilized have the same utilities as conventional urethane foams. Accordingly, polyurethane foams can be prepared by mixing together an organic isocyanate and a polyether containing active hydrogen and thereafter developing the foam reaction between these reactants. The mixture is foamed in the presence of a catalyst and a siloxane of this invention as a foam stabilizer by means of a blowing agent such as water, a fluorocarbon or other inert gas, or mixtures thereof.

Polyurethane foamed products containing siloxanes of this invention as foam stabilizers can be produced by known processes. One process is a one-shot technique wherein all of the reactants are reacted simultaneously with the foaming operation. The second type of general process is the prepolymer process. In this latter method a prepolymer is formed by completing the reaction between the polyether and the isocyanate. The prepolymer can later be foamed by reaction with water or inert blowing agent. Also, the quasi-prepolymer technique can be used to produce foams. In this technique, the isocyanate is first reacted with a portion of the polyether to give a product having a high percentage of free —NCO groups (e.g. from 20 to 50 percent), and this product is subsequently foamed by reaction with polyol and foaming agent.

The above-described processes are well known and are generally suitable for use with foam formulations containing siloxanes of this invention as foam stabilizers.

Thus, the foam formulations of this invention contain (1) a polyether (or mixture of polyethers) containing at least two active hydrogen atoms, (2) an organic isocyanate (or mixture of organic isocyanates) containing at least two isocyanate groups (3) a catalyst (or mixture of catalysts), (4) a blowing agent and (5) a siloxane of this invention. The polyethers used in these formulations are also known as "polyols." It is often convenient to provide mixtures of a siloxane of the invention and one or more, but not all, of the other components of the above-mentioned foam formulations. Such mixtures can be blended with the remaining components just prior to use in producing a foam. Such mixtures can be stored indefinitely without significant deterioration or reaction occurring due to the hydrolytic stability of the siloxanes. Suitable mixtures include siloxane-polyether mixtures; siloxane-catalyst mixtures; and siloxane-polyether-catalyst mixtures.

The active hydrogen-containing polyethers in the foam formulations of this invention include the linear and branched chain polyethers which have a plurality of acyclic ether oxygens and contain at least two hydroxyl radicals. Such hydroxyl groups are preferably alcoholic hydroxyl groups (as distinguished, for example, from the hydroxyl groups in carboxy groups, —COOH) and are most preferably attached to aliphatic carbon atoms (i.e. carbon atoms not in an aromatic ring). The polyethers have molecular weights, based on their hydroxyl values, ranging from 50 to 7500. Illustrative polyethers include the polyoxyalkylene polyols containing one or more chains of connected oxyalkylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene oxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide polyethers that are useful in the foam formulation of this invention include glycerol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside, and rhammoside, and polyethers prepared by the reaction of alkylene oxides with sucrose, for example:

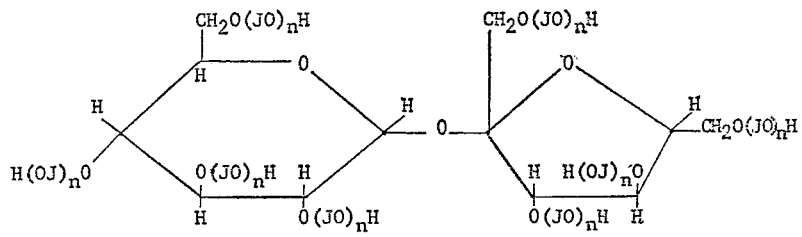

wherein J is an ethylene, propylene or butylene radical, or mixtures thereof and $n$ is an integer such that the average molecular weight of the polyether is 250 and higher.

Further polyethers that are useful in the foam formulation of this invention are prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6 - di - t. - butylcatechol, catechol, orcinol, methylphloroglucinol, 2,5,6-trimethylresorcinol, 4-ethyl-5,6-dimethylresorcinol, n-hexyl-resorcinol and 4-chloro-5-methylresorcinol; polyethers prepared by reacting 1,2-alkylene oxides or mixtures thereof with fused ring systems such as 3-hydroxy-2-naphthol, 6,7-dihydroxy - 1 - naphthol, 2-hydroxy-1-naphthol, 2,5-dihydroxy - 1 - naphthol, 9,10 - dihydroxyanthracene and 2,3-dihydroxyphenanthrene.

Other polyethers which can be employed in the foam formulations of this invention are those obtained by reacting 1,2-alkylene oxides or mixtures thereof with polynuclear hydroxy-benzenes such as the various di, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound. Exemplary diphenylol compounds include 2,2-bis(p-hydroxyphenyl) propane; bis(p-hydroxyphenyl)-methane and the various diphenols and diphenylol methanes disclosed in U.S. Patents Nos. 2,506,486 and 2,744,882, respectively. Exemplary triphenylol compounds which can be employed include the alpha, alpha, omega-tris(hydroxyphenyl)-alkanes such as 1,1,3-tris(hydroxyphenyl)ethanes; 1,1,3-tris - (hydroxyphenyl)propanes; 1,1,3 - tris(hydroxy - 3-methylphenyl) - propanes; 1,1,3-tris(dihydroxy-3-methylphenyl)propanes; 1,1,3-tris(hydroxy-2,4-dimethylphenyl) propane; 1,1,3-tris(hydroxy-2,5-dimethylphenyl)propanes; 1,1,3 - tris(hydroxy - 2,6-dimethylphenyl)-propane; 1,1,4-tris(hydroxyphenyl)butanes; 1,1,4-tris(hydroxyphenyl)-2-ethylbutanes; 1,1,4-tris(dihydroxyphenyl)butanes; 1,1,5-tris(hydroxyphenyl) - 3 - methylpentanes; 1,1,8-tris(hydroxyphenyl)octanes and 1,1,10-tris(hydroxyphenyl)decanes.

Tetraphenylol compounds which can be reacted with 1,2-alkylene oxides to produce polyethers that are useful in the foam formulations of this invention include the alpha, alpha, omega, omega - tetrakis(hydroxyphenyl) alkanes such as 1,1,2,2-tetrakis(hydroxyphenyl)ethanes; 1,1,3,3-tetrakis(hydroxy-3-methylphenyl)propanes; 1,1,3,3 - tetrakis(dihydroxy-3-methylphenyl)propanes; 1,1,4,4-tetrakis(hydroxyphenyl)butanes; 1,1,4,4-tetrakis(hydroxyphenyl) - 2-ethylbutanes; 1,1,5,5-tetrakis(hydroxyphenyl) pentanes; 1,1,5,5 - tetrakis(hydroxyphenyl)-3-methylpentanes; 1,1,5,5-tetrakis(dihydroxyphenyl)pentanes; 1,1,8,8-tetrakis(hydroxy - 3-butylphenyl)octanes; 1,1,8,8-tetrakis-(dihydroxy - 3 - butylphenyl)octanes; 1,1,8,8 - tetrakis (hydroxy - 2,5-dimethylphenyl)octanes; 1,1,10,10-tetrakis (hydroxyphenyl)decanes; and the corresponding compounds which contain substituent groups in the hydrocarbon chain such as 1,1,6,6-tetrakis(hydroxyphenyl)-2-hydroxy - 5 - methylhexanes and 1,1,7,7-tetrakis(hydroxyphenyl)-3-hydroxyheptanes.

Other particularly useful polyethers which can be employed in the foam formulations of this invention are the ethylene oxide, propylene oxide and butylene oxide adducts of phenol-formaldehyde condensation product materials such as the novolaks. Novolaks are mixtures of polynuclear compounds of the diphenylmethane type of structure such as 4,4'-dihydroxydiphenylmethane and 2,4'-dihydroxydiphenylmethane. Such compounds are free from methylol groups and are formed by the Baeyer reaction of phenol and formaldehyde. In a typical synthesis, novolaks are prepared by condensing one mole of phenolic compound, such as phenol or cresol, with 0.8 of an aldehyde, such as formaldehyde or furfural, under acid conditions at a temperature around 160° C. to 170° C. The polynuclear products frequently contain four to eight units and can contain twelve or more units. Novolaks, as such, are non-curable, thermoplastic resins.

Polyethers suitable for use in the foam formulations of this invention are prepared by reacting one or more of the alkylene oxides above noted with acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylenepentamine and dipropylenetriamine. A particularly suitable polyether is the propylene oxide addition product of diethylenetriamine represented by the formula:

[HO(H₆C₃O)g]₂—N—CH₂—CH₂—N—CH₂—CH₂—N—[(OC₃H₆)gOH]₂
(OC₃H₆)gOH wherein g represents an integer which provides an average molecular weight of 250.

Other suitable polyethers useful in the foam formulations of this invention include the 1,2-alkylene oxide derivatives of mononuclear primary amines such as o-, m-, and p-phenylenediamine; 2,4- and 2,6-diaminotoluene; 2,6 - diamino - p - xylene; 4,6 - diamino - m - xylene; 2,4 - diamino - m - xylene; 3,5 - diamino - o - xylene; isohexyl-p-phenylenediamino; 3,5-diaminotoluene, and the like; polynuclear and fused aromatic polyamines such as 1,4 - naphthylenediamine; 1,5-naphthylenediamine; 1,8-naphthylenediamine; benzidine, toluidine; 4,4'-methylenedianiline; 3,3' - dimethoxy - 4,4'-biphenyldiamine; 3,3'-dichloro-4,4'-biphenyldiamine; 3,3'-dimethyl-4,4'-biphenyldiamine; 4,4'-ethylenedianiline; 4,4'-ethylidenedianiline; 1-fluorenamine; 2,5 - fluorendiamine; 2,7 - fluorendiamine; 1,4-anthradiamine; 3,3'-biphenyldiamine; 3,4-biphenyldiamine; 9,10-diaminophenanthrene and 4,4'-diamino-azobenzene.

Higher functional mono- and polynuclear polyamines which also can be reacted with 1,2-alkylene oxides to provide polyethers suitable for use in the foam formulations of this invention include 2,4,6-triaminotoluene; 2,3,5-triaminotoluene; 5,6 - diaminoacenaphthene, 4,4',4"-methylidynetrianiline, 3,5-diaminobenzoic acid, triaminodiphenyl ethers and sulfides such as 2,4,4'-triaminodiphenyl ether; 2,3',4-triamino-4'-methyldiphenyl ether; 2,3'-4-triamino-4'-methoxydiphenyl ether; and polyamines obtained by interaction of aromatic monoamines with formaldehyde or other aldehydes, for example:

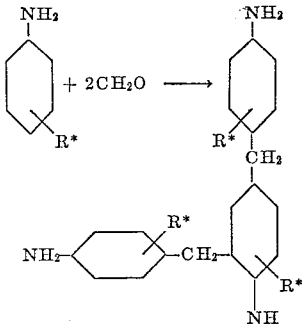

wherein R* is hydrogen or an alkyl group.

In addition to the hydroxyl-containing polyethers described above, many other classes of compounds containing active hydrogen atoms can react with organic isocyanates to produce urethane resin foams. Examples of other operable active hydrogen-containing compounds are hydroxyl-containing polyesters, polyamides and polyamines. The siloxanes of this invention are also foam stabilizers for urethane foam formulations containing such polyesters, polyamides and polyamines.

The molecular weight of the polyethers used should range from 250 to 7500 depending upon the characteristics desired in the foamed urethane product. As a general guide, cellular urethane foams of maximum rigidity are prepared by the use of polyethers having a molecular weight range of 250 to 1500; for semi-rigid foams the molecular weight of the polyether should be 800 to 1800; and for flexible open-cell foams the polyether should be of increased chain length and have a molecular weight of 1800 to 5000.

A variety of organic isocyanates can be employed in the foam formulations of this invention for reaction with the polyethers above described to provide urethane foams. Preferred isocyanates are polyisocyanates and polyisothiocyanates of the general formula:

Q(NCY)ᵢ wherein Y is oxygen or sulfur, $i$ is an integer of two or more and Q is an alkylene, substituted alkylene, arylene or substituted arylene radical, a hydrocarbon, or substituted hydrocarbon radical containing one or more aryl —NCY bonds and one or more alkyl —NCY bonds. Q can also include radicals such as —QZQ— where Z can be a divalent moiety such as —O—, —O—Q—O—, —CO—, —CO₂—, —S—, —S—Q—S— and —SO₂—. Examples of such compounds include hexamethylene diisocyanate, 1,8-diisocyanato, -p-methane, xylylene diisocyanate, (OCNCH₂CH₂CH₂OCH₂)₂, 1-methyl-2,4-diisocyanatocyclohexane, phenylene diisocyanates, toylylene diisocyanates, chlorophenylene diisocyanates, diphenylmethane-4,4'-diisocyanate, naphthalene-1,5-diisocyanate, triphenylmethane - 4,4',4" - triisocyanate, xylene-alpha, alpha'-diisothiocyanate, and isopropylbenzene-alpha-4-diisocyanate.

Further included among the isocyanates useful in the foam formulations of this invention are dimers and trimers of isocyanates and diisocyanates and polymeric diisocyanates of the general formulas:

Q(NCY)ᵢ and [Q(NCY)ᵢ]ⱼ in which $i$ and $j$ are integers of two or more, as well as compounds of the general formula:

L(NCY)ᵢ in which $i$ is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; compounds containing a $\equiv Si-NCY$ group, isocyanates derived from sulfonamides ($QCO_2NCO$), cyanic acid, thiocyanic acid, and compounds containing a metal —NCY radical such as tributyltin isocyanate.

The amount of isocyanate employed in the foam formulation of this invention will depend upon the density of the urethane foam and the amount of cross-linking desired. In general, the total —NCO equivalent to total active hydrogen equivalent of the polyether should be such as to provide a ratio of 0.8 to 1.2 equivalents of —NCO per equivalent of active hydrogen, and preferably a ratio of 1.0 to 1.1 equivalents.

The foaming of the foam formulations of this invention is effected by methylene chloride, by water, by liquefied fluorocarbon gases which have boiling points below 80° F. and above —60° F., or by other inert gases such as nitrogen, carbon dioxide, methane, helium and argon. The liquefied gases are saturated aliphatic fluorohydrocarbons which vaporize at or below the temperature of the foaming mass. Such gases are at least partially fluorinated and can also be otherwise halogenated.

Fluorocarbon blowing agents suitable for use in foaming the formulations of this invention include trichloromonofluoromethane; dichlorodifluoromethane; dichlorofluoromethane; 1,1-dichloro-1-fluoroethane; 1-chloro-1,1-difluoro, 2,2-dichloroethane; and 1,1,1-trifluoro, 2-chloro-2-fluoro, 3,3-difluoro-4,4,4-trifluorobutane. The amount of blowing agent used will vary with density desired in the foaming product. In general, it may be stated that for 100 grams of resin mix containing an average NCO/OH ratio of 1 to 1, 0.005 to 0.3 mole of gas is used to provide densities ranging from 30 to 1 pounds per cubic foot. If desired, water can be used in conjunction with the inert gas or fluorocarbon blowing agent, or water can be used as the only blowing agent.

Catalysts that are suitable for accelerating the polyether-isocyanate reaction in the foam formulations of this invention include amines and a wide variety of metal compounds, both inorganic metal compounds and metal compounds which contain organic groups. Particularly useful catalysts are tertiary amines and organo-tin compounds. All of the above catalysts can be used alone or in mixtures with one or more of the other such catalysts.

Among the organo-tin compounds suitable for use in the foam formulations of this invention that deserve particular mention are stannous acylates such as stannous acetate, stannous octoate, stannous laurate and stannous oleate; stannous alkoxides such as stannous butoxide, stannous 2-ethylhexoxide and stannous phenoxide, o-, m- and p-stannous cresoxides; dialkyl tin salts of carboxylic acids, e.g., dibutyltin diacetate, dibutyltin dilaurate, dibutyltin maleate, dilauryltin diacetate, and dioctyltin diacetate. Similarly, there can be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride and dioctyltin dichloride.

The tertiary amines which are useful as catalysts in the foam formulations of this invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine, N-octadecylmorpholine (N - cocomorpholine), N,N,N',N'-tetramethylethylenediamine, N,N,N',N'-tetramethyl-1,3-propanediamine, triethylenediamine (1,4-diazabicyclo[2.2.2]octane), triethylenetetramine, N,N-dimethylbenzylamine, N,N-dimethylcyclohexylamine, benzyltriethylammonium bromide, bis(N,N-diethylaminoethyl) adipate, N,N-diethylbenzylamine, N-ethylhexamethyleneamine, N-ethylpiperidine, alpha-methylbenzyldimethylamine, dimethylhexadecylamine, 3-methylisoquinoline, dimethylacetylamine, and isocyanates and metal compounds containing tertiary nitrogen atoms.

Typical tertiary amines containing active hydrogen atoms reactive with isocyanate groups suitable for use in the foam formulations of this invention include dimethylethanolamine, triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine and diethylenetriamine. Still other tertiary amines containing active hydrogen atoms reactive with isocyanate groups include polyesters based on polyols such as illustrated above including triethanolamine, triisopropanolamine and N-alkyl diethanolamines, as well as polycarboxylic acids containing tertiary nitrogen atoms.

Other catalysts suitable for use in the foam formulations of this invention include metal organic compounds of lead, arsenic, antimony, and bismuth compounds characterized by the presence therein of a direct carbon-to-metal bond; organic halides of titanium; the inorganic halides of tetravalent tin, arsenic, antimony, bismuth and titanium; polystannates; tin, titanium and copper chelates; and mercury salts. Representative members of this class of catalysts are stannic chloride, stannic bromide, stannic iodide, stannic fluoride, isopropoxysteoroxy polystannate, hydroxysteoroxy polystannate, tin chelates such as bis(acetylacetone)tin dichloride, arsenic trichloride, antimony trichloride, antimony pentachloride, antimony tributoxide, bismuth trichloride, titanium tetrachloride, bis(cyclopentadienyl)-titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, mercurous chloride, mercuric acetate, tributyl arsine, triphenyl stibine, trioctylbismuthine, octylarsine, phenyldimercaptoarsine, butyldichlorobismuthine, triphenylstibine iodide cyanide, isoamylarsenic disulfide, triethylstibine oxide, octylarsenic acid, dibutylstibinic acid, phenylarsenic dilaurate, butylbismuth dibenzenesulfonamide, arsenopropane, and bis(dibutylbismuth)oxide.

Still other catalysts suitable for use in the foam formulations of this invention include tertiary phosphines (such as trialkylphosphines and dialkylbenzylphosphines), strong bases (such as the alkali and alkaline earth metal hydroxides, alkoxides and phenoxides), chelates of various metals (such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salacylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like); alcoholates and phenolates of various metals (such as $Tl(OR^3)_4$, $Sn(OR^3)_4$, $Sn(OR^3)_2$, $Al(OR^3)_3$, and the like, wherein $R^3$ is alkyl or aryl), and the reaction products of alcoholates with carboxylic acids, beta-diketones, and 2-(N,N-dialkylamino)alkanols (such as the well known chelates of titanium obtained by said or equivalent procedures) salts of organic acids with a variety of metals (such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like); and other tin compounds (such as dibutyltin-bis(4-methylaminobenzoate), dibutyltin-bis(6-methylaminocaproate), dialkyltin dialkoxide, dialkyltin dichloride, trimethyltin hydroxide, tributyltin hydroxide, trioctyltin hydroxide, dibutyltin oxide, dioctyltin oxide, dilauryltin oxide, dibutyltin-bis(isopropoxide), dibutyltin - bis(2 - dimethylaminopentylate), dibutyltin dichloride, dioctyltin dichloride, and the like).

In addition to the above described polyethers, siloxanes, polyisocyanates, catalysts and blowing agents, the polyurethane foam compositions of this invention may contain, if desired, other components such as:

(a) Diol foaming modifiers, such as ethylene glycol, polyethylene glycol and the like;

(b) Crosslinking agents, such as pentaerythritol, glycerol, N,N,N′,N′-tetrakis(2-hydroxypropyl)ethylene diamine, and the like;

(c) Flame retardants, generally alkyl phosphates or inorganic compounds, such as antimony oxide and the like;

(d) Thermal stabilizers, such as d-tartaric acid, t-butyl catechol and the like;

(e) Plasticizers, such as di-octyl phthalate and the like;

(f) Fillers, such as scrap shredded foam, wood flour, metal flakes, and the like; and (g) Pigments, such as titania, silica, carbon black and the like;

(h) Dyes, antioxidants, antiozonants, deodorants, fungicides, and the like.

The amounts of the various components employed in the foam formulations of this invention are not narrowly critical.

When water is present as a foaming agent, amounts of water from 0.5 to 5 weight percent based on the total weight of the formulations can be advantageously employed.

The amount of catalyst to be employed in the urethane foam formulations of this invention is well understood by persons skilled in the urethane resin foam art. In general, the total amount of catalyst or mixture of catalysts is from 0.001 percent to 5 percent of the foam formulation.

The amount of this siloxane of this invention employed as a foam stabilizer in the foam formulations of this invention vary over wide limits from 0.1 weight percent to 10 weight percent or greater. [Weight percentages are based on the total weight of the foam formulation, that is, the polyether, isocyanate, catalyst, blowing agent and foam stabilizer.] There is no commensurate advantage to using amounts of foam stabilizer greater than 10 weight percent or less than 0.1 weight percent.

The siloxanes of this invention are also suitable for use in reducing the foaming of various liquids that have a tendency to foam. The siloxane employed in any given anti-foam application should be one that is insoluble or only slightly soluble in the liquid. When the siloxane is relatively soluble in a system, as they are in the above-described foam formulations, they do not function as anti-foam agents but rather function as foam stabilizers. In urethane foam stabilizing applications, the silicone portion of the siloxane (i.e. the portion of the siloxane other than the hydroxyhydrocarbyloxyalkyl group) should be such that, if the hydroxyhydrocarbyloxyalkyl group of the siloxane was replaced by a methyl group, the resulting compound would be insoluble in the foam formulation. The solubility of such urethane foam stabilizing siloxanes in the foam formulations is, therefore, attributable to the presence of the hydroxyhydrocarbyloxyalkyl groups and, more specifically to the presence of the hydroxyl groups therein.

Liquids whose tendency to foam can be successfully reduced by the siloxanes of this invention include aqueous alkylene glycol solutions (e.g. aqueous solutions of ethylene glycol, propylene glycol, butylene glycol, diethylene gycol, triethylene glycol and the like), latices composed of water in which are dispersed polymerized olefins (e.g. butadienestyrene copolymers, butadiene homopolymers, styrene homopolymers, and the like) and various hydrocarbon liquids. Preferably suitable latices contain from 10 to 120 parts by weight of a polymerized olefin per 100 parts by weight of water and suitable aqueous glycol solutions contain from 30 to 900 parts by weight of water per 100 parts by weight of the glycol. The above-mentioned latices are commonly formed when olefinic polymers are produced by emulsion polymerization as a step in the production of elastomers. Serious foaming can occur during the removal of unreacted olefin monomers from these latices. Hydrocarbon liquids whose tendency to foam is reduced by the siloxanes of the invention include the various liquid hydrocarbon fuels (e.g. kerosene, gasoline, diesel fuel and mixtures of such fuels with aromatic compounds such as biphenyl, toluene and/or methyl-substituted biphenyls) and hydrocarbon lubricating oils. Among the hydrocarbon lubricating oils that are suitable are the paraffinic oils, naphthenic lubricating oils and mixtures of such oils. Illustrative of such hydrocarbon lubricating oils are solvent extracted oils and acid treated oils. Typical of such oils are those having viscosities which range from 100 Saybolt Universal Seconds at 100° F. to 100 Saybolt Universal Seconds at 210° F. Also included are the various liquid hydrocarbon solvents (e.g. linear and cyclic aliphatic hydrocarbons, for example, n-hexane, heptane, octane and n-decane and cyclohexane as well as mineral oil and mixtures of such compounds with aromatic hydrocarbons) and particularly hydrocarbon solvents that are admixed with materials which increase the tendency of the solvent to foam (e.g. hydrocarbyl sulfates, and sulfonates and kerosene).

The liquids whose tendency to foam can be successfully reduced by the siloxanes of this invention can contain the additives customarily present in such liquids. Thus the aqueous alkylene glycols solutions can, in those instances where they are intended for use as antifreezes, contain the various corrosion inhibitors, sealants, anticreep agents, pH indicators and other additives commonly present in glycol antifreezes. Similarly the latices whose tendency to foam is reduced by the siloxanes of this invention can contain residual olefin polymerization catalysts, emulsifying agents and other additives commonly present in such latices. The hydrocarbon fuels can contain additives such as tetraethyl lead and the hydrocarbon solvents can contain such additives as hydrocarbyl sulfonates and sulfates (e.g. when the solvent is the vehicle in a cutting oil). Hydrocarbyl sulfonates and sulfates that can be present in the organic liquids whose tendency to foam is reduced in accordance with the present invention include methyl sulfonate, butyl sulfonate, phenyl sulfonate and tolyl sulfonate and dimethyl sulfate, dibutyl sulfate, diphenyl sulfate and ditolyl sulfate, as well as mixtures of sulfates or sulfonates produced by the sulfation or sulfonation of xylene, petroleum fractions or mineral oil. Alkali metal salts of such sulfates and sulfonates (e.g. sodium dodecylbenzene sulfonate and sodium dilauryl sulfate) can be present in such solvents.

The siloxanes of this invention can be added to a liquid whose tendency to foam is to be reduced either as such or in the form of a solution. Suitable solutions are composed of the siloxanes dissolved in an ether (e.g. the dimethyl ether of ethylene glycol) or in a hydrocarbon (e.g. styrene or hexane) or in a haloalkane (e.g. perchloroethylene). From 1.0 to 30 parts by weight of the siloxane per 100 parts by weight of the solvent can be advantageously employed. The siloxanes can also be added in the form of an aqueous emulsion. Solid siloxanes can be added in the solid state or in the molten state.

Many of the siloxanes of this invention are self-dispersing and distribute themselves uniformly throughout the liquid having a tendecy to foam without mechanical dispersing means being employed. However, such means (e.g. dispersators, colloid mills, magnetic stirrers, propeller stirrers and the like) can be employed if desired to disperse this siloxane.

The relative amount of the siloxane of this invention, used as an antifoam is not critical and can range from 0.5 to 50,000 parts by weight of the siloxane per million parts by weight of the liquid that has a tendency to foam; particularly good results are often obtained when from 1 to 100 parts by weight of the siloxane per million parts by weight of the liquid are used. Although other relative amounts of the siloxane can be used, no commensurate advantage is gained thereby.

The presence of the siloxanes of this invention reduces the tendency of the above-mentioned liquid to foam and does not impair the other useful properties of the liquid. Thus, antifreezes, polymer latices, fuels and solvents can, after the addition of such copolymers, function in their intended area of application. For example, kerosene containing such copolymers can be used as a fuel in lamps, stoves or jet engines.

The hydroxy groups in the hydroxyhydrocarbyloxyalkylsiloxanes of this invention can be reacted with a variety of organic compounds to produce derivatives suitable for use in new applications. By way of illustration, the hydroxy group can be reacted with diisocyanates (such as hexamethylene diisocyanate, 1,8-diisocyanato, -p-methane, xylylene diisocyanate, $(OCNCH_2CH_2CH_2OCH_2)_2$, 1-methyl-2,4-diisocyanatocyclohexane, phenylene diisocyanates, tolylene diisocyanates, chlorophenylene diisocyanates, diphenylmethane-4,4′-diisocyanate, naphthalene-1,5-diisocyanate, triphenylmethane-4,4′,4″-triisocyanate, xylenealpha, alpha′-diisothiocyanate, and isopropylbenzene-alpha-4-diisocyanate) employing conventional methods to produce corresponding urethane-modified siloxanes which can be reacted with polyhydroxy-compounds in producing urethane resin foams in accordance with known techniques. Such foams are useful in the areas wherein conventional urethane foams are employed.

The hydroxy groups in the hydroxyhydrocarbyloxyalkyl siloxanes of this invention can also be reacted to anhydrides or polycarboxylic acids (e.g. maleic anhydride or acid, phthalic anhydride or acid, and adipic anhydride or acid) employing conventional processes to produce polyesters which can be employed as protective coatings for metals.

In addition the hydroxy groups in the hydroxyhydrocarbyloxyalkyl siloxanes of the invention can be reacted with sulfamic acid to produce the corresponding ammonium sulfates which are water soluble and which can be used as surfactants (e.g. foaming agents, detergents and wetting agents).

Those siloxanes of this invention which contain alkenyl groups (e.g. those siloxanes containing the group represented by Formula 1 wherein R is an alkenyl group) can be reacted through their olefinic groups to produce useful derivatives. Thus, such alkenyl siloxanes can be epoxidized by known means. Still further, such alkenyl siloxanes can be reacted with the above-described siloxanes containing silanic hydrogen to produce adducts having the same utilities as the siloxanes of this invention. By way of illustration, the alkenyl siloxanes represented by Formula 1 can be reacted with the above-described siloxanes containing silanic hydrogen according to the above-described addition process to produce siloxanes containing groups having the formula:

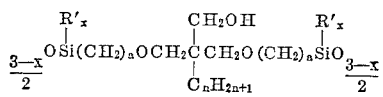

wherein R′, $a$, $n$ and $x$ have the above-described meanings. Such siloxanes can consist essentially of the latter groups or they can consist essentially of from 1 to 99 mole percent of the latter groups (or preferably from 10 to 90 mole percent of the latter groups) and from 1 to 99 mole percent (or preferably from 10 to 90 mole percent) of groups represented by Formula 4.

Typical of the various derivatives of the siloxanes of this invention mentioned above are the following siloxanes where preparation is described in detail in the examples presented below:

(a) Ortho-tolylisocyanate derivative prepared as described in Example 12 below:

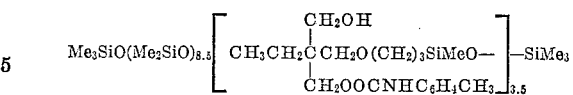

(b) Sulfamic acid derivative prepared as described in Example 13 below:

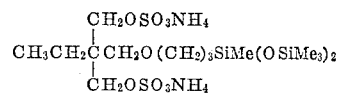

(c) Maleic anhydride derivative prepared as described in Example 14 below:

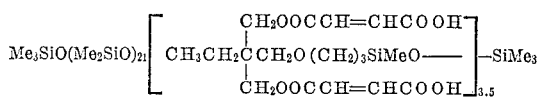

(d) Epichlorohydrin derivative and the quaternary derivative thereof prepared as described in Example 15 below:

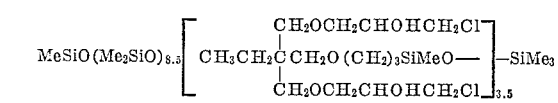

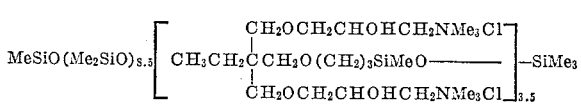

The siloxanes of this invention can be blended with conventional silicone elastomers or, by virtue of their hydroxy groups and any alkenyl groups, reacted with conventional silicone elastomers to produce blends or reaction products for enhancing the solvent resistance of this silicone elastomer.

As used herein "Me" denotes the methyl group, "hydrocarbonoxy" denotes a monovalent group composed of carbon, hydrogen, and oxygen wherein the free valence of the group is a valence of the oxygen atom, and "alkenyloxy" denotes a monovalent group composed of an alkenyl group linked to an oxygen atom.

The following examples illustrate the present invention:

Examples 1 to 11 illustrate the production of siloxanes of this invention.

Example 1

To a 2-liter flask equipped with mechanical stirrer, dropping funnel, thermometer, condenser and protective nitrogen atmosphere was added trimethylolpropane monoallyl ether (225 grams, 1.29 moles) and 400 milliliters of toluene as a solvent. The mixture was heated at reflux and a small amount of water removed. Chloroplatinic acid as a catalyst (20 parts per million platinum) was added and a hydrosiloxane of average composition $Me_3SiO(Me_2SiO)_{8.5}(MeHSiO)_{3.5}SiMe_3$ (275 grams, 1.03 mole SiH) was added slowly to the allylic alcohol at reflux over a period of one hour. The ether employed as a reactant contained 15.1 weight percent $-CH=CH_2$ and 19.2 weight percent alcoholic OH by analysis and the siloxane employed as a reactant contained 84 cubic centimeters of silanic hydrogen per gram and had a viscosity of 25° C. at 16.1 centistokes. Sodium bicarbonate (2.5 grams) was added and the reaction mixture sparged at 130° C. for 1½ hours with 3 liters nitrogen per minute. Filter aid was added and the product filtered under pressure. The viscosity at 25° C. of the nearly colorless liquid filtrate product (491 grams) was 4480 centistokes. The product consisted primarily of a siloxane having the average formula:

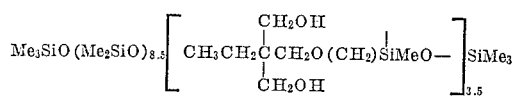

Some unreacted starting materials were also present. This product is referred to hereinafter as "Siloxane I." The bulk surface tension of the product was 24.1 dynes per centimeter.

Example 2

To a 2-liter flask equipped with mechanical stirrer, dropping funnel, thermometer, condenser and nitrogen atmosphere was added trimethylolpropane monoallyl ether (164 grams, 0.94 mole) and 400 milliliters of toluene. The ether contained 15.1 weight percent of $CH=CH_2$ and 19.2 weight percent of alcoholic OH by analysis. After heating the mixture to reflux and removing a small amount of water as the toluene azeotrope, chloroplatinic acid (20 parts per million platinum) was added. A hydrosiloxane of average composition $Me_3SiO(Me_2SiO)_{21}(MeHSiO)_{3.5}SiMe_3$ (346 grams, 0.71 mole SiH) was added slowly to the allylic alcohol at reflux over a period of about one hour. The siloxane starting material contained 46 cubic centimeters of hydrogen per gram and had a viscosity of 22.4 centistokes at 25° C. The reaction mixture was sparged 1½ hours at 130° C. with 3 liters of nitrogen per minute, filter aid added and the product filtered under pressure. The filtrate was a slightly yellow liquid product (440 grams) having a viscosity (25° C.) of 1928 centistokes. The product contained a small amount of unreacted starting materials and was composed mostly of a siloxane having the average formula:

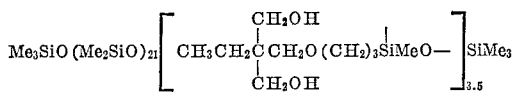

The product had a bulk surface tension of 20.2 dynes per centimeter. This product is referred to hereinafter as "Siloxane II."

Example 3

Trimethylolpropane diallyl ether (272 grams, 1.3 moles) was weighed into a 300 milliliter flask equipped with mechanical stirrer, dropping funnel, thermometer and distillation head and nitrogen atmosphere. Toluene solvent (340 grams) was added and the mixture heated to reflux. Chloroplatinic acid (6 parts per million platinum based on silicone plus the organic alcohol) was added then the hydrosiloxane having the formula $Me_3SiO(Me_2SiO)_{8.5}(MeSiHO)_{3.5}SiMe_3$ (66.3 grams, 0.25 moles SiH) added over a period of 25 minutes. Finally the reaction mixture was sparged to 165° C. at 8 liters of nitrogen per minute. The weight of the clear amber product obtained was 119 grams. The product was primarily a siloxane having the average formula:

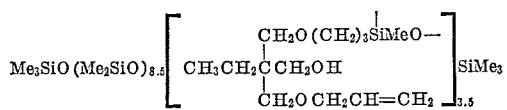

The product had a viscosity of 650 centipoises and contained a small amount of unreacted starting materials. This product is referred to hereinafter as "Siloxane III."

Example 4

Trimethylolpropane diallyl ether (76.7 grams, 0.35 mole) was weighed into a 300 ml. flask equipped with mechanical stirrer, dropping funnel, thermometer and distillation head and nitrogen atmosphere. Toluene solvent (100 grams) was added and the mixture heated to reflux. Chloroplatinic acid (20 parts per million platinum based on silicone plus the organic alcohol) was added, then the hydrosiloxane $Me_3SiO(Me_2SiO)_{105}(MeHSiO)_{8.8}SiMe_3$ (33.8 grams, 0.035 mole SiH) was added from the dropping funnel over a period of 13 minutes. Refluxing was continued for 25 minutes then the reaction mixture sparged at 170° C. with eight liters per minute of nitrogen. Weight of the clear amber silicone alcohol product obtained was 45 grams. This product was primarily a siloxane having the average formula:

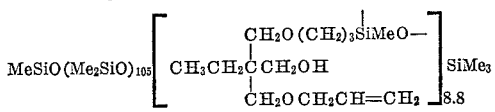

The product had a viscosity of 8000 centipoises and contained a small amount of unreacted starting materials. This product is referred to hereinafter as "Siloxane IV."

Example 5

To a 500 milliliter flask equipped with mechanical stirrer, condenser, thermometer, dropping funnel and nitrogen atmosphere was added trimethylolpropane diallyl ether (79.0 grams, 0.369 mole) and 200 milliliters of toluene. The ether contained 24.2 weight percent $—CH=CH_2$ and 7.7 weight percent alcoholic OH by analysis. The mixture was heated to reflux and a small amount of water removed. Chloroplatinic acid (20 parts per million initially) was added and then heptamethyltrisiloxane, $Me_3SiOMeHSiOSiMe_3$, (21 grams, 0.545 mole) was added slowly over a period of about three hours. During the addition a frequent check was made of SiH content in the reaction mixture, and during this addition more catalyst and more trimethylolpropane diallyl ether was added to insure satisfactory reaction of SiH. Altogether a total of 40 parts per million platinum and 91.2 grams, 0.426 mole, of trimethylolpropane diallyl ether was used. The reaction mixture was sparged with three liters per minute of nitrogen at 130° C. for two hours. The product (213 grams) was a clear amber liquid with a viscosity at 25° C. of 25 centistokes. It was a mixture of (a) a siloxane having the formula:

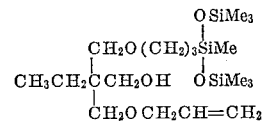

and (b) a siloxane having the formula:

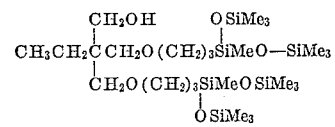

The product had a bulk surface tension of 22.9 dynes per centimeter and is referred to hereinafter as "Siloxane V."

Example 6

To a 500 milliliter flask equipped with mechanical stirrer, thermometer, dropping funnel and condenser was added trimethylolpropane monoallyl ether (initially 99 grams, 0.569 mole) and 200 milliliters of toluene and the mixture heated at reflux to remove traces of water. Chloroplatinic acid was added (20 parts per million) and a hydrosiloxane equilibrate of average composition $Me_3SiOMeHSiOSiMe_3$ (101 grams, 0.455 mole) was added dropwise to the refluxing mixture. Near the end of the addition a small amount of silanic hydrogen ether (3.9 grams, 0.022 mole) was added. The total trimethylolpropane monoallyl ether was now 102.9 grams, or 0.591 mole). Total overall addition time was about 45 minutes. The reaction mixture was sparged at 130° C. for two hours at a rate of 3 liters of nitrogen per minute. The product was a clear amber liquid, viscosity at 25° C., 883 centistokes. The product was primarily a siloxane having the formula:

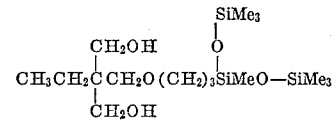

The product had a bulk surface tension of 24.1 dynes per centimeter and contained a small amount of unreacted starting materials. The siloxane is referred to hereinafter as "Siloxane VI."

Example 7

Pentaerythritol diallyl ether (19.4 g., 0.09 mole) and 200 ml. of toluene were heated to reflux in a 500 cc. flask equipped with mechanical stirrer, dropping funnel, thermometer and condenser. A trace of water was removed. Chloroplatinic acid in tetrahydrofuran (12 parts per million of Pt initially) was added and then distilled heptamethyltrisiloxane, $Me_3SiOMeHSiOSiMe_3$, (30.6 g., 0.14 mole) was added dropwise to the refluxing mixture. During the addition of the siloxane, the contents of the flask were checked for silanic hydrogen from time to time and small amounts of catalyst added to insure good catalytic activity. At the end of the addition, more pentaerythritol diallyl ether (1.5 g., 0.007 mole) was added to reduce the residual SiH to a very low value. The total pentaerythritol diallyl ether added was 20.9 g., 0.097 mole. One gram of sodium bicarbonate was added and the mixture sparged to 130° C. at three liters of nitrogen per minute. The sparged material was filtered. The siloxane of this invention so produced as a filtrate was an amber oil with a viscosity at 25° C. to 100 csts. It was soluble to at least 5 wt. percent in n-hexane, mineral spirits, isopropyl ether and ethanol. At this concentration it was insoluble in water. This siloxane had the formula:

$$[(Me_3SiO)_2MeSiC_3H_6OCH_2]_2C(CH_2OH)_2$$

Example 8

Pentaerythritol triallyl ether (25 g., 0.098 mole) was heated with 300 ml. of toluene in a 500 ml. flask equipped with stirrer, condenser, thermometer and dropping funnel, removing the trace of water as toluene-water azeotrope. Chloroplatinic acid in tetrahydrofuran (11 parts per million of Pt initially) was added, then distilled heptamethyltrisiloxane, $Me_3SiOMeHSiOSiMe_3$, (44 g., 0.20 mole) was added dropwise to the refluxing mixture. Fresh catalyst was added from time to time, and towards the end of the addition, when tests showed that silanic hydrogen persisted in the reaction mixture, more pentaerythritol triallyl ether (1.9 g., 0.007 mole) was added. The total amount of pentaerythritol triallyl ether added was 26.9 g. or 0.105 mole. The total amount of chloroplatinic acid added was equivalent to 60 parts per million of Pt based on the siloxane and allylated starting materials. Sodium bicarbonate (1 g.) was added and the reaction mixture sparged with three liters of nitrogen per minute at 130° C. Yield before filtration was 72 g. After filtration the siloxane of this invention so produced as a filtrate was a clear, light yellow liquid. The viscosity at 25° C. was 72 csts. The product was very soluble in hexane, mineral spirits, isopropyl ether and ethyl alcohol. It was essentially insoluble in water. The siloxane product had the formula:

$$[(Me_3SiO)_2MeSiC_3H_6OCH_2]_3CCH_2OH$$

Example 9

To dry 1,2,6-hexanetriol monoallyl ether (24.8 g., 0.142 mole) in refluxing toluene (200 cc.) containing 60 parts per million Pt (as chloroplatinic acid, initially), in a 500 cc. round bottom flask equipped with stirrer, thermometer, dropping funnel and condenser, was added dropwise an equilibrated hydrosiloxane of average composition $Me_3SiO(Me_2SiO)_{8.5}(MeHSiO)_{3.5}SiMe_3$ (24 g., 0.09 mole SiH). By analysis there were 266 g. of siloxane fluid mole of SiH. After completion of addition, one gram of sodium bicarbonate was added and the reaction mixture sparged to 130° C. with three liters of nitrogen per minute. The yield before filtration was 43 g. After filtration the filtrate product was a pale yellow liquid. The viscosity at 25° C. was 6700 cps. The product was essentially insoluble in hexane, mineral spirits, isopropyl ether and water but soluble in ethanol. The product was a siloxane of this invention composed of units having the average formula:

$$Me_3Si[OSiMe_2]_{8.5}[—OMeSi(CH_2)_3OC_6H_{11}(OH)_2]_{3.5}OSiMe_3$$

Example 10

To dry 1,2,6-hexanetriol diallyl ether (32.3 g., 0.142 mole) chloroplatinic acid catalyst (90 parts per million) and 300 ml. of toluene at reflux in a 500 cc. flask equipped with dropping funnel, condenser, thermometer and stirrer was added dropwise distilled heptamethyltrisiloxane, $Me_3SiOMeHSiOSiMe_3$, (45 g., 0.20 mole). After completion of addition, the reaction mixture was heated at reflux several minutes longer, then one gram of sodium bicarbonate added, and the mixture sparged to 130° C. At this point the yield of product silicone alcohol-ether was 75 g. The reaction mixture was then filtered. The filtered product was a clear, amber fluid with a viscosity of 29 cstks. In tests at 5% concentration of the silicone alcohol-ether, it was found to be soluble in mineral spirits, isopropyl ether and ethanol but insoluble in water. The product had the formula:

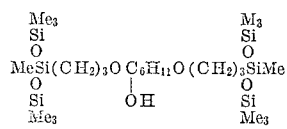

Example 11

To 2-vinyl-4-hydroxybutyldioxolane (68.5 g., 0.398 mole) in a 500 cc. flask equipped with condenser, dropping funnel, thermometer and stirrer was added 150 cc. of toluene and chloroplatinic acid in tetrahydrofuran (20 parts per million Pt). To the refluxing mixture an equilibrated hydrosiloxane of average empirical formula $Me_3SiO(Me_2SiO)_{8.5}(MeHSiO)_{3.5}SiMe_3$ (81.5 g., 0.31 mole of SiH) was added dropwise over a period of about three quarters of an hour. The adduct was then sparged to 130° C. with nitrogen. Yield 145 g. The silicone alcohole-ether product was a liquid with a Gardner color of three and had a viscosity at 25° C. of 1940 cstks. In test at 5 wt. percent product, it was soluble in ethanol and insoluble in hexane. It had the folowing average empirical structure:

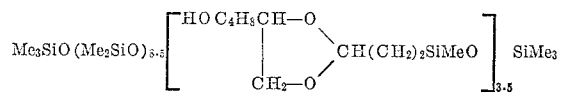

Examples 12 to 16 illustrate the preparation of various derivatives of the siloxanes of this invention.

Example 12

The silicone alcohol-ether product of Example 1 (38.4 g. polymer, 0.18 mole of OH) was weighed into a 500 cc. flask equipped with stirrer, thermometer and nitrogen atmosphere. Orthotolylisocyanate (11.6 g., 0.087 mole) and a catalytic amount of dibutyl tin dilaurate was added and the mixture stirred. There was a gradual exotherm and the temperature rose to 60° C. Stirring was continued while the reaction mixture slowly cooled to room temperature. The product silicone alcohol-ether containing urethane groups was a clear, almost colorless liquid with a viscosity at 25° C. of 34,000 cstks. It was quite soluble in isopropyl ether and ethanol but insoluble in water. Infrared analysis showed that the product was a dimethyl siloxane modified with both —$CH_2OH$ and —$NHCOOCH_2$— groups.

Example 13

The silicone alcohol-ether product of Example 6 (100 g., 0.52 mole of OH), sulfamic acid (59 g., 0.61 mole) and dimethylformamide as a solvent (159 g.) were stirred and heated together in a 500 cc. flask. Sulfation initiated at about 80° C. A temperature of 85° C. was maintained for one-half hour. The reaction mixture was neutralized at 85° C. with ammonia gas, then filtered. Part of the clear, yellow filtrate was stripped of solvent in vacuo to 138 g. of semisolid dimethyl siloxane modified with sulfate group, —CH$_2$OSO$_3$NH$_4$. This product had excellent surfactant properties. It was very soluble in water. A one percent solution in water had a surface tension of 24.0 dynes/cm. It was an excellent wetting agent, for example for cotton and polyethylene.

Example 14

To the silicone alcohol-ether product of Example 2 (39.2 g., 0.11 mole of OH) in a 500 cc. flask was added maleic anhydride (10.8 g., 0.11 mole). The reaction mixture was heated to 130° C. and sparged with nitrogen. The semi-solid product was completely soluble in ethanol/water (90/10 by volume). Dilution of this solution with water caused precipitation of the carboxy-modified siloxane. The ammonium salt, of the latter siloxane however, was completely soluble in water and was a strong profoamer.

Example 15

To the siloxane alcohol-ether of Example 1, (100 g., 0.41 mole) of OH was added 100 cc. of toluene, epichlorhydrin (57.9 g., 0.62 mole) and stannic chloride catalyst (0.5 g., 0.002 mole). Reaction was conducted in a 500 cc. flask equipped with condenser, stirrer, and thermometer. The reaction mixture was heated at reflux for about one hour, 6 g. of sodium bicarbonate added, refluxing continued for another hour, then the mixture sparged with nitrogen. The product was filtered under pressure. The dimethyl silicone chlorhydrin was a nearly colorless liquid with a viscosity at 25° C., of 12,000 cps. It contained the group —OMeSi(CH$_2$)$_3$OCH$_2$C(C$_2$H$_5$)(CH$_2$OCH$_2$CHOHCH$_2$Cl)$_2$ By analysis total chlorine was 9.0%, or a conversion fro malcohol to chlorhydrin of about 86%. Calc. Cl 10.5) Ionic Cl was less than 0.1%.

A water-soluble, stable quaternary silicone surfactant was prepared from the above silicone chlorhydrin: The chlorhydrin (20 g., 0.051 moles Cl) was combined with 20 cc. of water in a 500 cc. flask. A Dry Ice condenser, magnetic stirrer and thermometer were attached and trimethylamine (6 g., 0.10 mole) added. The reaction mixture was heated to about 60° C. Initially a slurry of water-insoluble silicone chlorhydrin was present, but within several minutes at 60° C. the reaction mixture became nearly clear. After fifteen minutes a sample of the reaction mixture was titrated directly for ionic chlorine. Percent chlorine was 6.3 based on solids, or about 80% conversion. After 40 minutes ionic chlorine was 7.3% or about 94% conversion. (Calc. Cl, 7.8, for 100% conversion). The reaction mixture was sparged vigorously at 80° C. to give a pale yellow solution of product quaternary silicone surfactant at 77% solids. This quaternary gave a clear solution when diluted with water and was a strong profoamer. It contained the group:

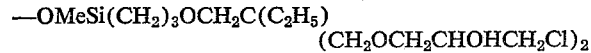
—OMeSi(CH$_2$)$_3$CH$_2$C(C$_2$H$_5$)(CH$_2$OCH$_2$CHOHCH$_2$ÑMe$_3$Cl⁻)$_2$ The addition process employed in producing the siloxanes of this invention is characterized by the selectivity and rapid reaction rate of allyloxy and vinyloxy alcohols with silanic hydrogen. Only a relatively small amount of reaction occurs at the COH group. This is not the case with an alkenyl alcohol such as allyl alcohol. The following experiment involving addition of allyl alcohol to a hydrosiloxane exemplifies this difference:

To a one liter flask equipped with stirred, condenser, thermometer and dropping funnel was added allyl alcohol (116.2 g., 2.0 moles) and 350 cc. of toluene. The solution was heated at reflux, 80 parts per million Pt added as chloroplatinic acid, an equilibrated hydrosiloxane of average composition

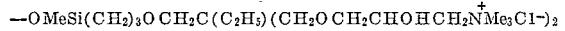
Me$_3$SiO(Me$_2$SiO)$_{8.5}$(MeHSiO)$_{3.5}$SiMe$_3$ (266 g., 1.0 mole SiH) was also added dropwise. Addition of SiH to the allyl group was very sluggish. Intermittently during the addition, the flow of hydrosiloxane was shut off and after several minutes, an external test made for silanic hydrogen in the reaction mixture. All tests showed that substantial amounts of SiH remained. After completion of addition and an hour at reflux plus overnight standing, there was still substantial SiH in the reaction mixture. The mixture was heated at reflux for 45 minutes, after which time the external test with silver nitrate finally showed that only trace amounts of SiH remained. The reaction mixture was filtered, then sparged at 130° C. The product was a clear, amber fluid.

Analysis.—For complete addition to form the groups OMeSiC$_3$H$_6$OH: Calcd. OH, 5.3;—CH=CH$_2$—, 0.0. Found: OH, 1.7 (Phthalation) and 1.0 (Grignard); —CH=CH$_2$—, 4.6. If all reaction of SiH had occurred at the COH groups, the calculated —CH=CH$_2$— is 8.4.

It is evident from the latter experiment that (1) reaction of SiH was extremely sluggish compared to reactions with allyloxy or vinyloxy types and (2) more reaction of SiH had occurred at the COH group than at the double bond. This product would contain gross amounts of hydrolyzable linkages. After several weeks storage this product gelled. In contrast, the adduct of this same SiH fluid with trimethylolpropane monoallyl ether showed very little viscosity increase after several months.

Evidence for the relative selectivity of addition of the C=C group in synthesis of the siloxanes of this invention was also found in derivatives of these silicone alcohols. The water soluble quaternary of Example 15 was prepared in hot water under moderate alkalinity, conditions for cleavage of SiOC links. Such cleavage would result in free silicone, or silicone-rich fractions, which would be insoluble in water. This basic concentrate was clear, however, and required no filtration. Neutralized, diluted aqueous solutions, containing one percent active quaternary, were also clear and stable. Example 13 demonstrates that water soluble and hydrolytically stable anionics can be synthesized by direct reaction of sulfamic acid with silicone alcohols. If gross amounts of SiOC links had been present this would not have been possible.

Examples 16 to 19 illustrate the use of siloxanes of this invention as antifoam agents.

Example 16

This experiment shows that the silicone alcohols produced in Example 1 above (designated Siloxane I) and in Example 2 above (designated Siloxane II) are effective antifoams in hot glycol-water mixtures containing trace quantities of aromatics. This foaming mixture simulates foaming conditions that can occur during the aromatic stripping operation used commercially to separate aromated hydrocarbon from aliphatic hydrocarbon during fractional distillations of petroleum.

APPARATUS

The apparatus used for this test consisted of a one liter graduate cylinder having a heating jacket through which 350 centistoke dimethylsiloxane oil (having the formula:

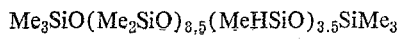
Me$_3$SiO(Me$_2$SiO)$_x$SiMe$_3$) at 132° C. is circulated. The graduated cylinder is also fitted with a gas dispersion tube having a 30 mm. medium porosity fitted glass disc. The dispersion tube is connected by rubber tubing to a rotameter which is in turn connected to a nitrogen cylinder by a rubber hose.

The foaming mixture consists of 25% by weight of a 3:1 (by weight) mixture of diethylene glycol and dipropylene glycol and 75% by weight distilled water. 0.5 wt. percent (based on total glycol-water mixture) of xylene is added as a trace contaminant to promote foaming.

PROCEDURE

The glycol-water-aromatic mixture is heated to boiling (105° C.) and then 150 ml. of this boiling mixture is added to the jacketed graduated cylinder. The antifoam is then added via a pipette as a 1% solution in dimethyl Cellosolve. The mixture is stirred and then the gas dispersion tube, through which 1 liter/minute of nitrogen is flowing, is inserted into the apparatus. Foam volumes (milliliters) are recorded at time intervals (minutes).

RESULTS

The data in Table I shows that the siloxanes of this invention are effective antifoams for this system and that they have an advantage over the reference antifoam in that they are more durable (i.e. their effect lasts longer).

TABLE I

| Antifoam | Conc. of Antifoam (p.p.m.)[1] | Total Volume (ml.) (Foam Plus Liquid) At Time Intervals (Minutes) | | | | | |
|---|---|---|---|---|---|---|---|
| | | 0.5 | 1.0 | 3.0 | 5.0 | 10.0 | 15.0 |
| Blank | | 326 | 316 | 296 | 286 | 280 | 270 |
| Siloxane I | 1 | 240 | 236 | 233 | 226 | 223 | 216 |
| | 2 | 195 | 195 | 200 | 200 | 200 | 200 |
| | 7 | 180 | 180 | 180 | 180 | 175 | 170 |
| Siloxane II | 1 | 220 | 220 | 220 | 220 | 210 | 210 |
| | 2 | 235 | 235 | 225 | 220 | 215 | 205 |
| | 7 | 180 | 180 | 180 | 180 | 180 | 170 |
| Reference I[2] | 7 | 180 | 180 | 180 | 180 | 220 | 285 |

[1] Parts per million.
[2] A commercially available silicone antifoam.

Example 17

This experiment shows that the silicone alcohols produced in Example 1 above (designated Siloxane I) and in Example 2 above (designated Siloxane II) are effective antifoams in lubricant oils. For the test, uncompounded "California Lube Oil," obtained from the Cities Service Company, is used as representative of lubricant oils in which an antifoam is needed.

APPARATUS

This test was conducted at room temperature. The apparatus used for this test consists of (1) a 1 liter graduate and (2) a gas dispersion tube with a 30 mm. diameter medium porosity fritted disc connected by rubber tubing to a rotameter which is connected to a nitrogen cylinder by a rubber tube.

PROCEDURE 100 ml. of the lubricant oil is added to a 4 oz. jar. 0.1 ml. of a 0.1% solution of the antifoam in dimethyl Cellosolve ($MeOCH_2CH_2OMe$) is then added via a 1.00 cc. syringe. The jar is sealed, hand shaken, and the contents poured into a 1 liter graduate. The gas dispersion tube, through which nitrogen is flowing at 1 liter/minute, is inserted into the graduate and an electric timer started. Total volume (foam+liquid) is then recorded at time intervals. Two series of tests were run simultaneously and were designated Test A and Test B respectively.

RESULTS

Table II shows that the SiH fluid-trimethylolpropane monoallyl ether adducts (Siloxane I and Siloxane II) are effective antifoams in lubricant oil and, within experimental error, are equivalent to a conventional silicone antifoam.

TABLE II

| Antifoam | Concentration of Antifoam (p.p.m.) | Total Volume (Foam Plus Liquid) At Time Intervals (ml.) | | | | | | | | | | | |
|---|---|---|---|---|---|---|---|---|---|---|---|---|---|
| | | Test A | | | | | | Test B | | | | | |
| | | 0.5[1] | 1.0 | 3.0 | 5.0 | 10.0 | 15.0 | 0.5 | 1.0 | 3.0 | 5.0 | 10.0 | 15.0 |
| Blank | | 150 | 200 | 320 | 380 | 380 | 390 | 140 | 170 | 280 | 350 | 380 | 390 |
| Reference II[2] | 1 | 120 | 120 | 130 | 140 | 140 | | 120 | 120 | 120 | 120 | 120 | |
| Siloxane II | 1 | 120 | 130 | 150 | 150 | 160 | 180 | 120 | 130 | 140 | 140 | 150 | 150 |
| Siloxane I | 1 | 130 | 130 | 130 | 130 | 140 | | 130 | 130 | 130 | 130 | 130 | |

[1] Minutes.
[2] Conventional Silicone Antifoam.

Example 18

This experiment shows that Siloxane I (produced as described in Example 1) is an effective antifoam in crude oil. For the test, Venezuelan Crude Oil was used as the foaming media and intended to be representative of crude petroleum oils in which antifoams are used.

APPARATUS

This test was conducted at room temperature. The apparatus used for this test consisted of (1) a 1 liter graduate and (2) a gas dispersion tube with a 30 mm. diameter medium porosity fritted disc, connected by rubber tubing to a rotameter which is connected to a nitrogen cylinder by a rubber hose.

PROCEDURE (Standard Bikerman Foam Test)

100 ml. of the Venezuelan crude oil is added to a 4 oz. jar. 0.1 ml. of a 0.1% solution of the antifoam in dimethyl Cellosolve ($MeOCH_2CH_2OME$) is then added via a 1.00 cc. syringe. The jar is sealed, hand shaken, and the contents poured into a 1 liter graduate. The gas dispersion tube, through which nitrogen is flowing at 1 liter/minute, is inserted into the graduate and an electric timer started. Total volumes are then recorded at time intervals.

RESULTS

Table III shows that the SiH fluid-trimethylolpropane monoallyl ether adduct, (Siloxane I) is an effective antifoam in crude oil and, within experimental error, is equivalent to a conventional silicone antifoam (Reference II).

TABLE III

| Antifoam | Concentration of Antifoam (p.p.m.) | Total Volume (Foam Plus Liquid) At Time Intervals | | | | | | | | | | | |
|---|---|---|---|---|---|---|---|---|---|---|---|---|---|
| | | Test A | | | | | | Test B | | | | | |
| | | 0.5[1] | 1.0 | 3.0 | 5.0 | 10.0 | 15.0 | 0.5 | 1.0 | 3.0 | 5.0 | 10.0 | 15.0 |
| Blank | | [2]190 | 240 | 340 | 330 | 330 | 330 | 180 | 220 | 290 | 310 | 320 | 310 |
| Reference II | 1 | 120 | 120 | 120 | 120 | 120 | 120 | 120 | 120 | 120 | 120 | 120 | 120 |
| Siloxane I | 1 | 130 | 140 | 140 | 140 | 140 | 140 | 130 | 140 | 130 | 130 | 130 | 130 |
| Siloxane VII[3] | 1 | 130 | 140 | 140 | 150 | 150 | 150 | 130 | 140 | 150 | 150 | 150 | 150 |

[1] Minutes.
[2] Milliliters.
[3] Reaction product of 8.8 moles monoallyl ether of trimethylol propane and 1.0 mole $Me_3SiO(MeSiHO)_{8.8}(Me_2SiO)_{105}SiMe_3$.

Example 19

The manufacture of butadiene-styrene latices involves the stripping of residual styrene from the finished product. It is during this stripping operation that foaming occurs and such foaming can be minimized employing siloxanes of this invention (Siloxanes I to IV and VII to XIII) as antifoams as described below.

In this test the foaming medium consists of 100 ml.

of a butadiene-styrene latex in a 1000 ml. graduate. Nitrogen gas is admitted at 1 liter/minute through a medium porosity gas dispersion tube.

All the siloxanes were added as 10% solutions in perchloroethylene. All antifoams were tested at 100 parts per million. Table IV shows that the siloxanes of this invention performed well as antifoams in this test. In addition, these siloxanes did not cause undesirable coagulation of the latex.

The latex used was composed of about 50 wt. percent water and, dispersed therein, about 50 wt. percent of a butadienestyrene copolymer.

with aluminum foil and was maintained at 120° F. during the addition of the foam formulation. The form formulation was allowed to remain in the mold for 30 minutes at ambient temperature and the rigid foam molded product so produced was then carefully removed from the mold. The height of the vertical section of the product so produced indicated that the foam formulation had filled 69.8 percent of the vertical section of the mold. There were 60 cells per inch in the molded product which had a density of 1.79 pounds per cubic foot. After cold aging the vertical and horizontal sections of the molded product underwent an angular deflection of 5.8° from the original

TABLE IV

| Antifoam | Reaction Product of— | | Concentration of Antifoam (p.p.m.) | Total Volume (Foam Plus Liquid) At Time Intervals (ml.) [1] | | | | | | | | | | | |
|---|---|---|---|---|---|---|---|---|---|---|---|---|---|---|---|
| | Ether [2] | Silicone [3] | | Test A | | | | | | Test B | | | | | |
| | | | | 0.5 [4] | 1.0 | 3.0 | 5.0 | 10.0 | 15.0 | 0.5 | 1.0 | 3.0 | 5.0 | 10.0 | 15.0 |
| Blank [5] | | | | 480 | 510 | 710 | 850 | O.T. | | 460 | 500 | 790 | 1,000+ | O.T. | |
| Blank | | | | 525 | 690 | (6) | (6) | (6) | (6) | | | | | | |
| Reference III [7] | | | 100 | 273 | 317 | 457 | 557 | 727 | 833 | | | | | | |
| Siloxane XIII | .05 MATMP | .01 MD$_{119}$D′$_{4.4}$M | 100 | 320 | 380 | 470 | 430 | 450 | 510 | 280 | 340 | 400 | 390 | 420 | 500 |
| Siloxane IV | .36 DATMP | .004 MD′$_{8.8}$D$_{105}$M | 100 | 320 | 400 | 510 | 530 | 620 | 730 | 340 | 430 | 640 | 680 | 830 | 990 |
| Siloxane VII | .11 MATMP | .01 MD′$_{8.8}$D$_{105}$M | 100 | 270 | 340 | 440 | 470 | 620 | 700 | 340 | 410 | 530 | 590 | 760 | 900 |
| Siloxane VIII | .12 MATMP | .02 MD$_{51}$D′$_{4.4}$M | 100 | 240 | 260 | 340 | 430 | 540 | 580 | 250 | 270 | 340 | 410 | 500 | 510 |
| Siloxane IX | .05 DATMP | .08 (MD$_{4.8}$D′M) | 100 | 370 | 390 | 580 | 660 | 680 | 830 | 360 | 430 | 610 | 710 | 760 | 870 |
| Siloxane X | .11 MATMP | .09 MD$_6$M′ | 100 | 200 | 250 | 370 | 430 | 440 | 490 | 230 | 280 | 380 | 430 | 510 | 580 |
| Siloxane XI | 1.0 DATMP | 2(MD$_3$M′) | 100 | 290 | 370 | 520 | 590 | 690 | 800 | 320 | 400 | 520 | 590 | 700 | 820 |
| Siloxane XII | 1.0 DATMP | 2(MM′) | 100 | 310 | 410 | 620 | 750 | 920 | 990 | 350 | 470 | 730 | 980 | 730 | 940 |
| Siloxane III | DATMP | MD$_{8.5}$D′$_{3.5}$M | 100 | 300 | 360 | 500 | 510 | 630 | 730 | 290 | 350 | 480 | 520 | 670 | 810 |
| Siloxane II | MATMP | MD$_{21}$D′$_{3.5}$M | 100 | 260 | 320 | 504 | 500 | 675 | 875 | | | | | | |
| Siloxane I | MATMP | MD$_{8.5}$D$_{3.5}$M | 100 | 339 | 390 | 610 | 800 | 1,000+ | O.T. | 380 | 460 | 640 | 760 | 1,000+ | O.T. |

[1] O.T., denotes that the foam overflowed out of the graduate.
[2] MATMP denotes the monoallyl ether of trimethylol propane and DATMP denotes the diallyl ether of trimethylol propane.
[3] M, denotes the trimethylsiloxy group (Me$_3$SiO$_{0.5}$); D, denotes the dimethylsiloxy group (Me$_2$SiO); D′, denotes the methylhydrogensiloxy group (MeSiHO) and M′, denotes the dimethylhydrogensiloxy group (Me$_2$SiHO$_{0.5}$). The numbers before the symbols (e. g. before MATMP) denote moles of the reactants represented by the symbols.
[4] Minutes.
[5] 0.1 vol. percent Perclene added.
[6] Erratic severe foaming.
[7] A commercially available antifoam.

Examples 20 and 21 illustrate the use of siloxanes of this invention as foam stabilizers in the production of urethane foams.

Example 20

A rigid urethane foam was produced from the following materials employing a quasi-prepolymer process:

| Material: | Grams |
|---|---|
| A polyether produced from propylene oxide employing a mixture of 95 wt. percent sorbitol and 5 wt. percent water as a starter and having a hydroxyl number of 490 | 157.5 |
| Trichlorofluoromethane | 79.1 |
| Siloxane I | 2.34 |
| Dibutyl tin dilaurate | 1.1 |
| A quasi-prepolymer having 30 weight percent free isocyanate groups and produced by reacting an excess tolylene diisocyanate and the above mentioned polyether | 210.0 |

The following procedure was followed in producing the foam. The polyether was placed in a 1000 milliliter beaker. The dibutyl tin dilaurate catalyst and Siloxane I foam stabilizer were placed in a 50 milliliter beaker. The catalyst and the foam stabilizer were washed from the 50 milliliter beaker into the 1000 milliliter beaker with a portion of the trichlorofluoromethane blowing agent. Then the balance of the blowing agent was added to the 1000 milliliter beaker. The mixture so formed in the 1000 milliliter beaker was maintained at 77° F. and the quasi-prepolymer which was at a temperature of 86° F., was added rapidly thereto while mixing the mixture with a stirrer rotating at 3000 revolutions per minute. The foam formulation so produced was introduced into a steel mold. This mold consisted of a horizontal section and a vertical section joined at an angle of 90° and having an L-shaped cross section. This mold was designed to produce molded products consisting of two sections, one vertical and one horizontal, joined at a right angle together so as to have an L-shaped vertical cross section. The mold was lined right angle defined by the sections. The foam was free of large voids and the cells were of excellent uniformity.

When the above procedure was followed, omitting the use of Siloxane I, the degree of fill of the mold was extremely low, the dimensional stability of the molded products so produced was very poor and the cells were coarse and irregular and had occasional large voids.

Example 21

A series of flexible foams were produced employing siloxanes of this invention as foam stabilizers. The following materials were employed in producing these flexible foams following a "one shot" process or one step process.

| Material | Grams Per 100 Grams of Polyether | Grams |
|---|---|---|
| Polyether produced from propylene oxide employing glycerol as a starter and having a hydroxyl number of 56 | 100.0 | 350.0 |
| Distilled water | 4.0 | 14.0 |
| N,N,N′,N′-Tetramethyl-1,3-butanediamine | 0.1 | 0.35 |
| N-Ethylmorpholine | 0.2 | 0.7 |
| Siloxane | See Table V | |
| Stannous Octoate | 0.3 | 1.05 |
| Tolylene-di-isocyanate | 50.0 | 174.5 |

The following procedure was followed in producing the foams. The polyether was placed in a 1-liter beaker and the siloxane was added to it. The water, as a blowing agent, stannous octoate catalyst, N,N,N′,N′-tetramethyl-1,3-butanediamine catalyst and N-ethylmorpholine catalyst were mixed in a small beaker and the mixture so formed was added to the 1-liter beaker. The mixture was stirred for 8 seconds by a stirrer rotating at 3000 revolutions per minute. The stirring was continued while the tolylene di-isocyanate was added and the stirring of the foam formulation so produced was continued for another 7 seconds. The foam formulation was poured into a paper-lined cardboard box (12 inches long x 12 inches wide x 8 inches high), allowed to rise and then cured by heating for 15 minutes at 130° C. The properties of the flexible foam so produced are shown in Table V. These properties compare favorably with those foams produced employing commercially available silicone foam stabilizers in place of the siloxanes of this invention. When no foam stabilizer is used the foam collapsed.

TABLE V.—PROPERTIES OF FOAMS PRODUCED EMPLOYING SILOXANES OF THIS INVENTION AS FOAM STABILIZERS

| Siloxane | Foam Rise (Inches) | Collapse of Foam | | Cells per Inch | Cell Uniformity | Grams of Siloxane Per 100 Grams of Polyether |
|---|---|---|---|---|---|---|
| | | Top | Bottom | | | |
| I [1] | 8.7 | Nil | Nil | 35–40 | Fair | 0.75 |
| | 8.0 | Nil | Nil | 25–30 | do | 0.30 |
| | 8.4 | Nil | Nil | 25–30 | do | 0.23 |
| II [2] | 7.3 | Nil | Nil | 35–40 | Good | 1.2 |
| | 7.6 | Nil | Nil | 10–15 | do | 0.3 |
| XIV [3] | 8.2 | Nil | Nil | 40–45 | Fair to Good | 1.2 |
| III | 8.8 | Nil | Nil | 40–45 | do | 1.2 |

[1] Three foams were produced with this siloxane, each at a different siloxane concentration as shown.
[2] Two foams were produced with this siloxane, each at a different siloxane concentration as shown.
[3] Produced as described in Example 11.

As mentioned above, this invention provides mixtures containing a siloxane of this invention and one or more, but not all, of the remaining ingredients needed for producing a polyurethane foam. Such mixtures can contain a major amount of a polyether (polyol) and a minor amount of the siloxane or minor amounts of both the siloxane and a catalyst for the polyether-isocyanate reaction. Other mixtures can contain from 10 to 90 wt. percent of the siloxane and from 10 to 90 wt. percent of a catalyst for the reaction of the ether and the isocyanate. These various mixtures are stable and can be stored for prolonged periods. When a foam is desired, the remaining ingredients can be added and a foam produced by conventional methods.

Useful derivatives of the siloxanes of this invention also include siloxanes wherein a hydroxy group of the siloxanes of this invention have been replaced with an acyloxy group derived from a monocarboxylic acid. Such acyloxysiloxanes can also contain —$SO_3NH_4$ groups formed by reacting other hydroxy groups of the siloxanes of this invention with sulfamic acid. Such acyloxy-containing siloxanes include those that are represented by the formulae:

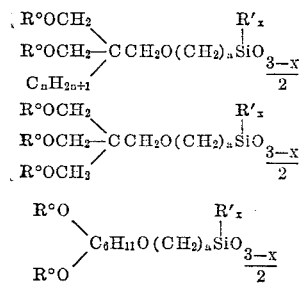

wherein at least one group represented by R° in each formula is an acyl group and the remaining groups represented by R° are acyl groups, —$SO_3NH_4$ groups or hydrogen atoms and the remaining symbols have the meanings defined above. Such acyl groups have the formula:

$$CH_3(CH_2)_mCO$$

wherein $m$ has a value from 0 to 30. When the acyl group is derived from a high molecular weight of monocarboxylic acid (e.g., lauric acid, palmitic acid or stearic acid), the acyloxysiloxanes are useful as waxes. Typical of such siloxane waxes are those having the unit:

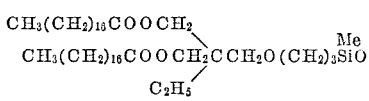

and those having the unit:

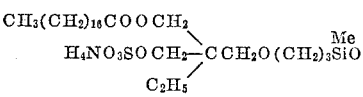

These acyloxy-containing siloxanes are readily prepared by employing alkenyl ethers containing acyloxy groups as reactants with hydrosiloxanes of the above-described addition reaction. Alternately, these acyloxysiloxanes can be produced by esterifying siloxanes of this invention with monocarboxylic acids or their derivatives by esterification procedures. Acyloxysiloxanes wherein one group represented by R° is a —$SO_3NH_4$ group are readily produced by reacting acyloxysiloxanes wherein one group represented by R° is hydrogen with sulfamic acid. Example 22 illustrates the productions of such acyloxysiloxanes.

Example 22

A mixture was formed containing 172.5 grams of an alkenyl ether having the formula

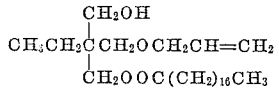

and 500 cubic centimeters of toluene. To this mixture was added 40 parts by weight of platinum per million parts by weight of the reactants. The platinum was added in the form of chloroplatinic acid. Over a period of 15 minutes 77.5 grams of a siloxane having the average formula $$Me_3SiO(Me_2SiO)_{8.5}(MeSiHO)_{3.5}SiMe_3$$

was added to the mixture. The mixture was heated to reflux and maintained at reflux during the addition of the siloxane. The reaction product so formed was sparged to remove volatile materials by heating at 130° C. for one hour while nitrogen was bubbled through the reaction product at a rate of three liters per minute. There was so produced a siloxane having the formula:

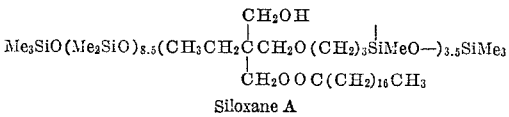

Siloxane A

The $CH_2OH$ group in siloxane A is readily converted to a $CH_2OSO_3NH_4$ group by reacting siloxane A with sulfamic acid using standard reaction conditions (e.g. as described in Example 13 above).

A wax was formed by mixing 10 grams of Siloxane A with the following ingredients.

Grams

A trimethylsiloxy end-blocked dimethylpolysiloxane having a viscosity of 350 centistokes at 25° C. __ 10
Carnauba wax No. 1 _____ 5
Petrolite P25 (a commercially available petroleum wax) _____ 5
Superfloss (silica powder) _____ 2

Snow Floss (refined diatomaceous earth) -------- 6
Turpentine ----------------------------------- 3
Mineral spirits ------------------------------- 69

The wax was formed by premixing all of the ingredients (other than the clay and the silica) and heating the premixture so formed at 200° F. to melt the waxes. Then the clay and the silica were added and heating at 200° F. was continued for another 5 to 10 minutes. The wax so formed was applied with cheesecloth to a metal panel coated with an acrylic paint. The ease of application, gloss, durability and water resistance of the wax coating so produced compared favorably with the properties of the coatings produced with commercially available waxes.

The siloxanes of this invention are not limited to the above-described siloxanes produced by reacting hydrosiloxanes and alkenyl ethers of monomeric alcohols (such as the alkenyl ethers of trimethylolpropane, pentaerythritol and hexanetriol). Thus the siloxanes of this invention also include adducts produced by reacting hydrosiloxanes and alkenyl ethers of polymeric alcohols. Suitable alkenyl ethers of polymeric alcohols include those produced by reacting trimethylolpropane, pentaerythritol or hexanetriol and alkylene oxides (e.g. ethylene oxide or propylene oxide) by conventional processes in which the trimethylolpropane, pentaerythritol or hexanetriol functions as a starter. The siloxanes of this invention produced from hydrosiloxanes and alkenyl ethers of polymeric alcohols are generally useful in the same areas as are the above-described siloxanes produced from hydrosiloxanes and the alkenyl ethers of monomeric alcohols.

What is claimed is:

1. A substituted hydroxyhydrocarbyloxyalkylsiloxane wherein (1) the hydroxyhydrocarbyloxy contains up to 14 carbon atoms, (2) the substituent on the hydroxyhydracarbyloxy is a member selected from the group consisting of hydroxy and lower alkenyloxy, (3) the alkyl is a lower alkyl and contains at least two successive carbon atoms linking the hydroxyhydrocarbyloxy to silicon, one of which carbon atoms is bonded directly to silicon, (4) at least two silicon atoms are linked by an oxygen atom and (5) any remaining valences of silicon link the silicon atom to a member selected from the group consisting of hydrogen atoms, lower alkyl, phenyl, naphthyl, tolyl and beta-phenylethyl.

2. A siloxane selected from the group consisting of (a) siloxanes consisting essentially of groups having the formula:

$$\begin{array}{c} ROCH_2 \\ HOCH_2 \\ C_nH_{2n+1} \end{array} \!\!\!\!> \!\!CCH_2O(CH_2)_a SiO_{\frac{3-x}{2}}^{R'_x} \quad (1)$$

wherein R is a member selected from the group consisting of the hydrogen atom and lower alkenyl, $n$ has a value of from 2 to 10 inclusive, $a$ has a value from 2 to 5, R' is a monovalent hydrocarbyl free of olefinic unsaturation selected from the group consisting of lower alkyl, phenyl, naphthyl, tolyl and beta-phenylethyl, and $x$ has a value from 0 to 2 inclusive; (b) siloxanes consisting essentially of groups having the formula:

$$\begin{array}{c} ROCH_2 \\ HOCH_2 \\ ROCH_2 \end{array} \!\!\!\!> \!\!CCH_2O(CH_2)_a SiO_{\frac{3-x}{2}}^{R'_x} \quad (2)$$

wherein R, $a$, R' and $x$ have the above-defined meanings; (c) siloxanes consisting essentially of groups having the formula:

$$\begin{array}{c} HO \\ HO \end{array} \!\!\!\!> \!\!C_6H_{11}O(CH_2)_a SiO_{\frac{3-x}{2}}^{R'_x} \quad (3)$$

wherein R, $a$, R' and $x$ have the above-defined meanings; (d) siloxanes consisting essentially of from 1 to 99 mole percent of groups represented by formula (1) and from 1 to 99 mole percent of groups represented by the formula:

$$\frac{Z_z SiO_{4-z}}{2} \quad (4)$$

wherein Z is a member selected from the group consisting of R' having the meaning given above and the hydrogen atom, and $z$ has a value from 0 to 3 inclusive; (e) siloxanes consisting essentially of from 1 to 99 mole percent of groups represented by formula (2) and from 1 to 99 mole percent of groups represented by formula (4); and (f) siloxanes consisting of from 1 to 99 mole percent of groups represented by formula (3) and from 1 to 99 mole percent of groups represented by formula (4).

3. A siloxane as defined in part (a) of claim 2.
4. A siloxane as defined in part (b) of claim 2.
5. A siloxane as defined in part (c) of claim 2.
6. A siloxane as defined in part (d) of claim 2.
7. A siloxane as defined in part (e) of claim 2.
8. A siloxane as defined in part (f) of claim 2.
9. A siloxane having the average formula:

$$Me_3SiO(Me_2SiO)_{8.5}\left[\begin{array}{c} CH_2OH \\ | \\ CH_3CH_2CCH_2O(CH_2)_3SiMeO- \\ | \\ CH_2OH \end{array}\right]_{3.5}\!\!\!SiMe_3$$

10. A siloxane having the average formula:

$$Me_3SiO(Me_2SiO)_{21}\left[\begin{array}{c} CH_2OH \\ | \\ CH_3CH_2CCH_2O(CH_2)_3SiMeO- \\ | \\ CH_2OH \end{array}\right]_{3.5}\!\!\!SiMe_3$$

11. A siloxane having the average formula:

$$Me_3SiO(Me_2SiO)_{8.5}\left[\begin{array}{c} CH_2O(CH_2)_3SiMeO- \\ | \\ CH_3CH_2CCH_2OH \\ | \\ CH_2OCH_2CH=CH_2 \end{array}\right]_{3.5}\!\!\!SiMe_3$$

12. A siloxane having the average formula:

$$Me_3SiO(Me_2SiO)_{105}\left[\begin{array}{c} CH_2O(CH_2)_3SiMeO- \\ | \\ CH_3CH_2CCH_2OH \\ | \\ CH_2OCH_2CH=CH_2 \end{array}\right]_{8.8}\!\!\!SiMe_3$$

13. A siloxane having the formula:

$$\begin{array}{cc} CH_2OH & SiMe_3 \\ | & | \\ CH_3CH_2CCH_2O(CH_2)_3SiMeO-SiMe_3 \\ | \\ CH_2OH \end{array}$$

14. A siloxane having the formula:

[(Me$_3$SiO)$_2$MeSiC$_3$H$_6$OCH$_2$]$_2$C(CH$_2$OH)$_2$

15. A siloxane having the formula:

[(Me$_3$SiO)$_2$MeSiC$_3$H$_6$OCH$_2$]$_3$CCH$_2$OH

16. A siloxane having the average formula:

Me$_3$Si[OSiMe$_2$]$_{8.5}$[—OMeSi(CH$_2$)$_3$
$\quad\quad\quad\quad$OC$_6$H$_{11}$(OH)$_2$]$_{3.5}$OSiMe$_3$ 17. A siloxane having the formula:

$$\begin{array}{ccc} Me_3 & & Me_3 \\ Si & & Si \\ O & & O \\ MeSi(CH_2)_3O\,C_6H_{11}O(CH_2)_3SiMe \\ O & OH & O \\ Si & & Si \\ Me_3 & & Me_3 \end{array}$$

18. A siloxane having the average formula:

$$Me_3SiO(Me_2SiO)_{8.5}\left[\begin{array}{c} HOC_4H_8CH-O \\ | \quad\quad\quad\quad\quad \backslash \\ \quad\quad\quad\quad\quad\quad CH(CH_2)_2SiMeO \\ | \quad\quad\quad\quad\quad / \\ CH_2-O \end{array}\right]_{3.5}\!\!\!SiMe_3$$

(References on following page)

References Cited

UNITED STATES PATENTS

| | | | |
|---|---|---|---|
| 2,416,504 | 2/1947 | Trautman et al. | 252—49.6 |
| 2,435,124 | 1/1948 | Balinger | 252—49.6 |
| 3,044,971 | 7/1962 | Polis | 260—2.5 |
| 3,067,150 | 12/1962 | Domburo | 260—2.5 |
| 3,168,543 | 2/1965 | Black | 260—448.2 |
| 3,172,899 | 3/1965 | Bailey | 260—448.2 |

NICHOLAS S. RIZZO, *Primary Examiner.*

DONALD E. CZAJA, *Examiner.*

J. H. TURNIPSEED, *Assistant Examiner.*